United States Patent [19]

Ooba

[11] 4,346,977
[45] Aug. 31, 1982

[54] BLADE TYPE FOCAL PLANE SHUTTER

[76] Inventor: Osamu Ooba, Kohokudai 9-8-18, Abiko-shi, Chiba-ken, Japan

[21] Appl. No.: 258,784

[22] Filed: Apr. 29, 1981

Related U.S. Application Data

[63] Continuation-in-part of Ser. No. 113,031, Jan. 15, 1980, abandoned.

[30] Foreign Application Priority Data

Jan. 19, 1979 [JP] Japan .............................. 54-5452[U]

[51] Int. Cl.³ .............................................. G03B 9/40
[52] U.S. Cl. .................................................. 354/246
[58] Field of Search ................................ 354/245–250; 350/266

[56] References Cited

U.S. PATENT DOCUMENTS 3,903,539  9/1975  Kitai et al. ........................... 354/246
4,009,946  3/1977  Geyer et al. ..................... 354/274 X Primary Examiner—John Gonzales
Attorney, Agent, or Firm—Cushman, Darby & Cushman

[57] ABSTRACT

A blade type focal plane shutter comprising a main arm, an auxiliary arm pin-slot-connected to the main arm, a main opaque lamina for forming an exposure slit pivoted on the main arm and pin-slot-connected to the auxiliary arm, and a plurality of auxiliary opaque laminae for covering an exposure aperture rotatably supported by a common shaft and pin-slot-connected to the main arm wherein the main lamina is made of material high in mechanical strength such as steel and the auxiliary laminae are made of such comparatively light material as plastics, aluminum, titanium, beryllium or a composite of them, to make the shutter small and to reduce the weight of the entire shutter blade assembly. Among the plurality of auxiliary laminae, one lamina to be used to support the main lamina is made of a material high in mechanical strength.

9 Claims, 7 Drawing Figures

PRIOR ART FIG. 1
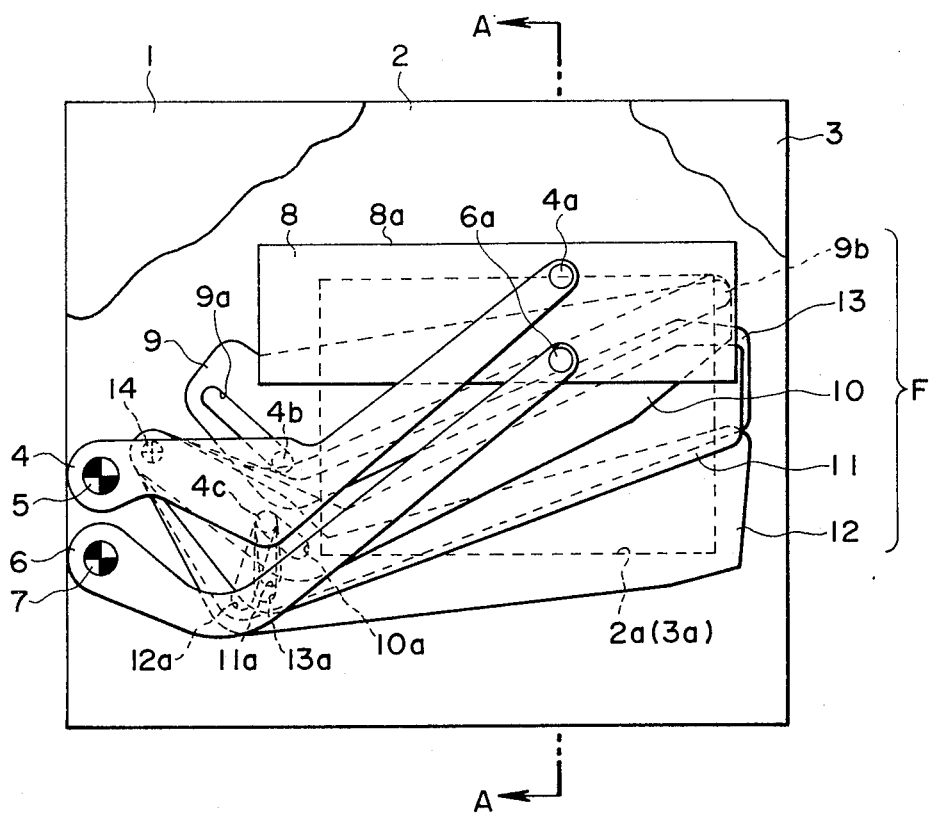
PRIOR ART FIG. 2
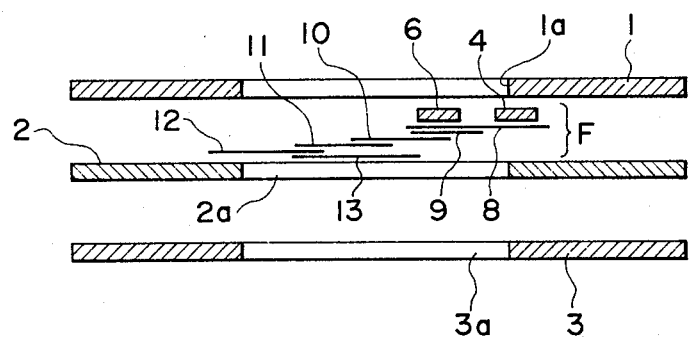

PRIOR ART FIG. 3
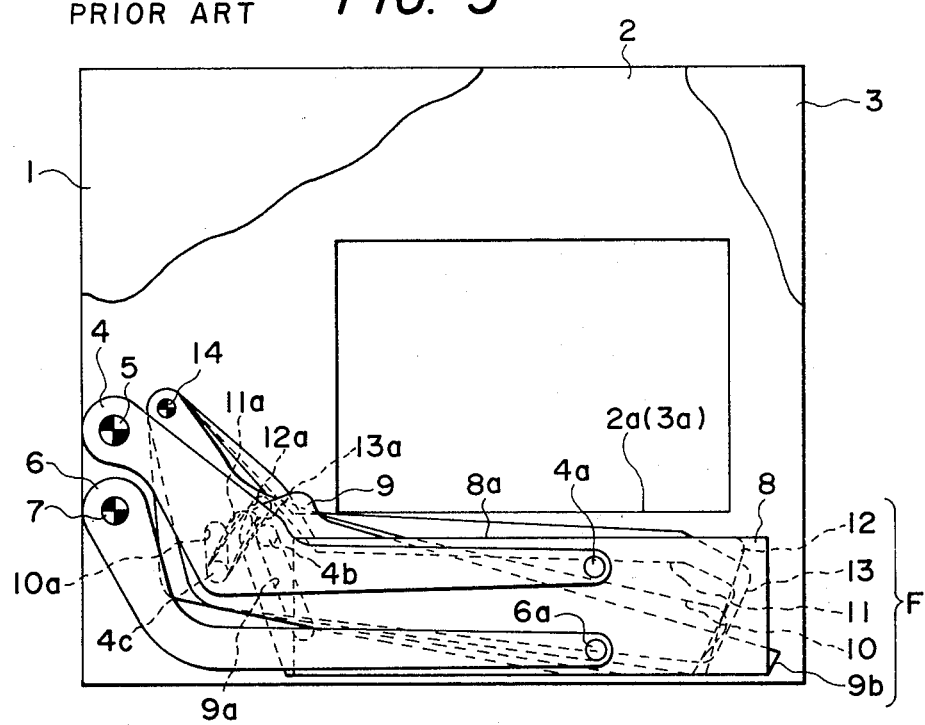
FIG. 4
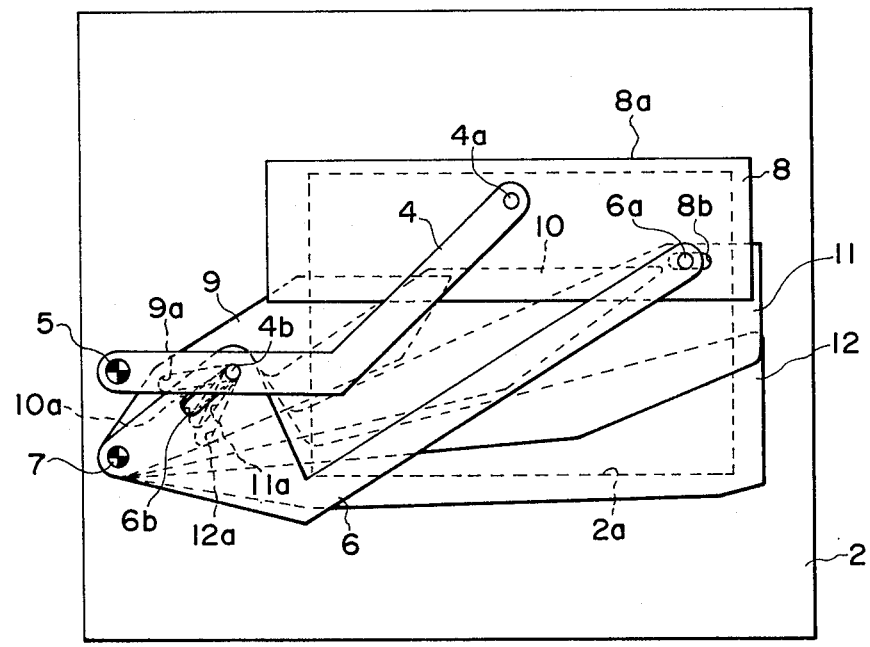

BLADE TYPE FOCAL PLANE SHUTTER

This is a continuation-in-part of Application Ser. No. 113,031, filed Jan. 15, 1980, now abandoned (corresponding to Japanese Utility Model Appln. No. 5452/79, filed Jan. 19, 1979)

BACKGROUND OF THE INVENTION (a) Field of the invention

This invention relates to blade type focal plane shutters and more particularly to an improvement of supporting structure for exposure slit forming shutter blades.

(b) Description of the Prior Art

Generally, in a blade type focal plane shutter, each of front blade group and rear blade group consists of a plurality of opaque laminae, one of the laminae is used for form an exposure slit and the remainder are used to cover an exposure aperture.

FIGS. 1 to 3 show an example of conventional focal plane shutter of such type as described above. In the drawings, only a front blade group F is shown but a rear blade group is omitted to simplify the illustration. In FIGS. 1 to 3, reference numeral 1, 2 and 3 denote respectively a shutter base plate, intermediate plate and cover plate which are integrally combined with one another at proper intervals through connecting members not illustrated and in which exposure apertures 1a, 2a and 3a aligned with one another are respectively formed. Reference numeral 4 denotes a main arm which is pivoted in the base portion on the base plate 1 through a shaft 5 and has pins 4a, 4b and 4c erected respectively in the tip portion and intermediate portion. 6 denotes an auxiliary arm which is pivoted in the base portion on the base plate 1 through a shaft 7 and has a pin 6a erected in the tip portion. 8 denotes a main rectangular lamina which is pivoted on the arms 4 and 6 respectively through the pins 4a and 6a, has an end edge 8a for forming an exposure slit and is made of such material high in the specific gravity and strength as steel. As the pivots 5, 7, 4a and 6a are so arranged that the line segments connecting their center points may form a parallelogram, the end edge 8a will move always in parallel with the long sides of the exposure apertures 1a, 2a and 3a. Reference numeral 9 denotes an auxiliary lamina which is arranged just below the lamina 8, has a cam slot 9a formed in the base portion so as to slidably fit the pin 4b, is pivoted in the intermediate portion to the auxiliary arm 6 through the pin 6a, extends in the tip portion 9b over the exposure apertures 1a, 2a and 3a and is made of the same material as of the lamina 8. Reference numerals 10, 11, 12 and 13 denote auxiliary laminae which are arranged in turn below the lamina 9, are pivoted in the respective base portions on the intermediate plate 2 through a shaft 14, have slots 10a, 11a, 12a and 13a formed in the respective intermediate portions so as to slidably fit the pin 4c, extend in the respective tip portions over the exposure apertures 1a, 2a and 3a and are made of the same material as of the lamina 9. The laminae 9, 10, 11, 12 13 are so arranged that respective two adjacent ones may partly overlap each other to be used to cover the exposure apertures 1a, 2a and 3a together with the lamina 8 when they are unfolded as shown in FIG. 1 and that they may be contained as mostly overlapped in a space formed by the base plate 1 and intermediate plate 2 in a position retreated from the exposure apertures 1a, 2a and 3a when they are folded as shown in FIG. 3.

The formation of the front blade group F has been explained in the above. In fact, a rear blade group consisting of six laminae is arranged in a space formed by the intermediate plate 2 and cover plate 3 so as to be in a mirror image relation with the front blade group F so that the rear blade group may be folded in a position retreated upward of the exposure apertures 1a, 2a and 3a when the front blade group F is unfolded as shown in FIG. 1 and may be unfolded to cover the exposure aperture 1a, 2a and 3a when the front blade group F is folded as shown in FIG. 3.

The operation shall be explained in the following:

In the cocked state in FIG. 1, when the shutter is released, the main arm 4 will be quickly rotated clockwise by a driving spring or driving member not illustrated. At this time, the auxiliary arm 6 will be simultaneously rotated clockwise through the lamina 8 and therefore the end edge 8a of the lamina 8 will lower to the position in FIG. 3 while remaining in parallel with the long sides of the exposure apertures 1a, 2a and 3a. On the other hand, the lamina 9 will be rotated clockwise to the position in FIG. 3 by the auxiliary arm 6 while being restrained in the base portion by the connection of the pin 4b with the cam slot 9a and the laminae 10, 11, 12 and 13 will be rotated clockwise to the positions in FIG. 3 around the shaft 14 by the connection of the pin 4c with the cam slots 10a, 11a, 12a and 13a. In this case, the respective laminae 12, 11, 13, 10, 9 and 8 will reach the positions in FIG. 3 in the order mentioned while increasing the overlap with each other, therefore, when the lamina 8 retreats from the exposure apertures 1a, 2a and 3a, the exposure apertures will be fully opened and, during the movement, the respective laminae will not collide with each other. In fact, when the lamina 8 retreats from the exposure apertures as described above or opens a part of the exposure apertures, the folded rear blade group will advance into the exposure apertures 1a, 2a and 3a to cover them. Therefore, it is needless to say that the exposure apertures will result in being opened only during a set time.

The shutter is cocked by rotating the main arm 4 counterclockwise from the position in FIG. 3 to the position in FIG. 1 by means of a winding mechanism not illustrated. In this case, the front blade group F will be unfolded simultaneously with folding the rear blade group and therefore the exposure apertures 1a, 2a and 3a will not be opened.

By the way, recently, it is required to make cameras small. In the focal plane shutter of the above mentioned structure, the height of the base plate 1, intermediate plate 2 and cover plate 3, that is to say, the width of them in vertical direction will have to be made made as small as possible to fulfill this requirement. Further, to make them small, the number of opaque laminae which form the front and rear blade groups will have to be increased as much as possible and the width of the respective lamina in vertical direction will have to be made as small as possible.

However, in the conventional blade supporting structure as described above, if the width of the respective lamina in vertical direction is made small, the distance between the pins 4a and 6a for pivotably supporting the main lamina 8 will also shorten. This results in the unstable support of the main lamina 8 and will make it difficult to move the end edge 8a for forming an exposure slit in parallel with the horizontal edge of the exposure apertures 1a, 2a and 3a. Therefore, there is a limit to making the width of the main lamina 8 in the vertical direction small.

Further, in the conventional blade supporting structure as described above, the distance between the pivots 5 and 7 of the arms 4 and 6 must be equal to the distance between the pins 4a and 6a. Therefore, there is also a limit to making the distance between the pivots 5 and 7 short as apparent from the above mentioned reason. This will make it difficult to make the shutter small.

SUMMARY OF THE INVENTION

A primary object of the present invention is to provide a blade supporting structure for blade type focal plane shutters wherein, even if the width in vertical direction of a main rectangular lamina for forming an exposure slit is comparatively small, it is possible to make long enough the distance between pivotal pins to keep a stable parallel movement.

This object, according to the present invention, is attained by pivoting the main lamina on one of a pair of supporting arms and pin-slot-connecting the other to said main lamina.

Another object of the present invention is to make blade type focal plane shutters having the blade supporting structure as proposed light without giving a wrong effect on their life.

This object according to the present invention, is attained by making the main lamina of steel and making a plurality of auxiliary laminae of any one of plastic, aluminum, titanium, beryllium and a composite of them.

These and other objects of the present invention will become apparent during the course of the following detailed description and appended claims.

BRIEF DESCRIPTION OF THE DRAWINGS

FIG. 1 is an elevational view of essential parts showing as cocked an example of a conventional blade type focal plane shutter;

FIG. 2 is a sectional view along the line A—A in FIG. 1;

FIG. 3 is an elevational view of essential parts in case the shutter shown in FIG. 1 is uncocked;

FIG. 4 is an elevational view of essential parts showing as cocked an embodiment of a blade type focal plane shutter according to the present invention;

DESCRIPTION OF THE PREFERRED EMBODIMENTS

Figure 5:
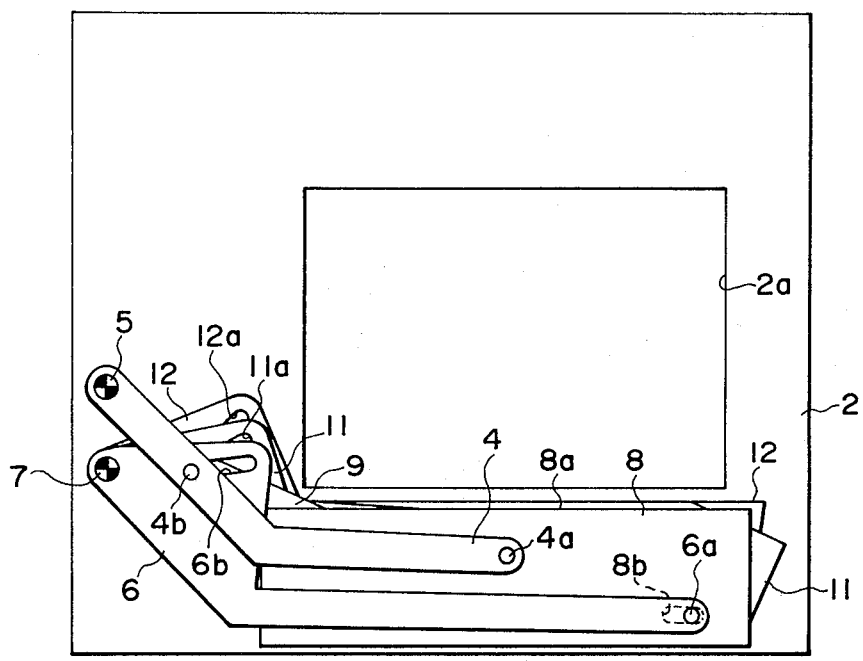
FIG. 5 is an elevational view of essential parts in case the shutter shown in FIG. 4 is uncocked.

First, with reference to FIGS. 4 and 5, an embodiment of the present invention shall be explained. In this embodiment, only a front blade group is shown but a rear blade group is omitted to simplify the illustration and the same reference numerals are attached to the parts and portions substantially identical with the respective parts and portions shown in FIGS. 1 to 3. This embodiment is different from the formation shown in FIG. 1 in respect that the auxiliary arm 6 is pin-slot-connected to the main arm 4, that the lamina 8 for forming the exposure slit is pin-slot-connected to the auxiliary arm 6 and the line segments connecting the shafts 5 and 7 and pins 4a and 6a do not form a parallelogram and that the laminae 9, 10, 11 and 12 are rotatably supported by the shaft 7. In this embodiment, too, the lamina 8 is made of such material high in the mechanical strength as steel and the other laminae 9, 10, 11 and 12 are made of such comparatively light material as plastics, aluminum, beryllium, titanium or a composite containing them. This embodiment has an advantage that, even if the lamina 8 is formed to be narrow, the arms 4 and 6 will be able to be supported very stably and is advantageous to make the entire shutter small.

Figure 6:
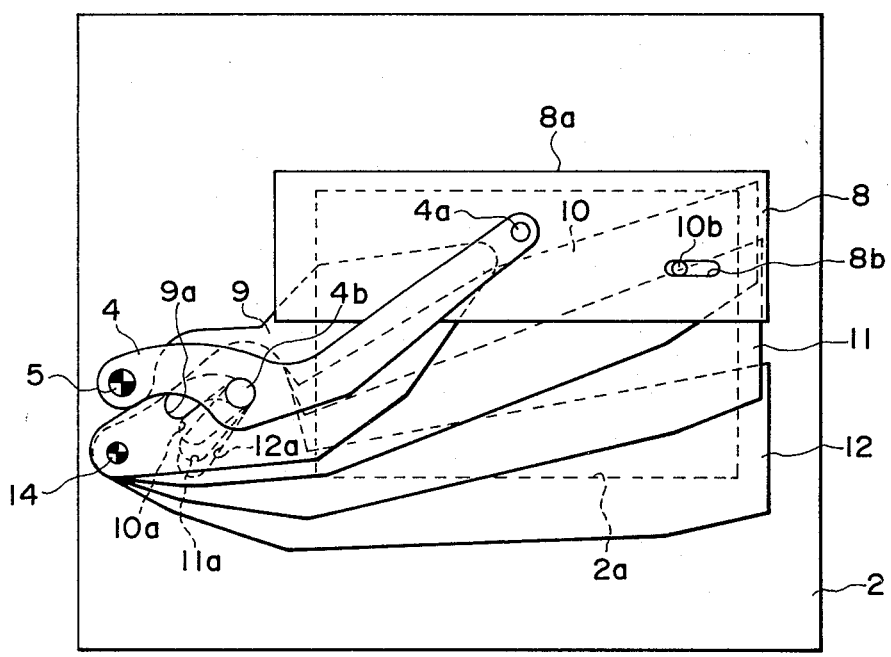
FIG. 6 is an elevational view of essential parts showing as cocked another embodiment of a blade type focal plane shutter according to the present invention.
Figure 7:
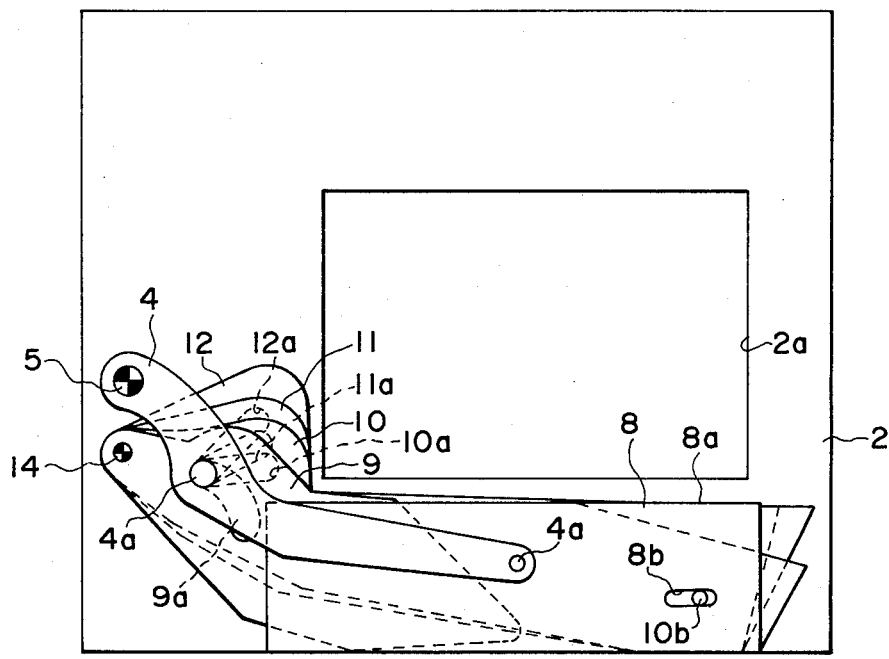
FIG. 7 is an elevational view of essential parts in case the shutter shown in FIG. 6 is uncocked.

FIGS. 6 and 7 show another embodiment of the present invention. This embodiment is different from the embodiment in FIG. 4 in respect that the lamina 8 for forming the exposure slit is pin-slot-connected to the lamina 10 and no auxiliary arm is present. That is to say, in this embodiment, the slot 8b formed in the lamina 8 slidably fits the pin 10b erected on the lamina 10 so that the formation of the blade group may be more simplified and the entire shutter may be made small and light. In this embodiment, the lamina 10 functions substantially as an auxiliary arm.

As the entire structure and function of the shutters shown in FIGS. 4 to 7 are the same as shown in FIGS. 1 to 3, the detailed explanation of them is omitted.

I claim:

1. A blade type focal plane shutter comprising:
   a shutter base plate having an exposure aperture therein;
   a main arm rotatably supported on said base plate at the side of said exposure aperture;
   an auxiliary arm rotatably supported on said base plate at the side of said exposure aperture and pin-slot-connected to said main arm;
   a plurality of auxiliary opaque laminae rotatably supported by a common shaft on said base plate at the side of said exposure aperture, each of said auxiliary laminae being pin-slot-connected to said main arm and respectively movable between exposure aperture covering positions and exposure aperture opening positions; and
   a main opaque lamina pivoted on said main arm and pin-slot-connected to said auxiliary arm and movable between an exposure aperture covering position and an exposure aperture opening position to form an exposure slit, said main lamina being made of material comparatively high in strength and said auxiliary laminae being made of material lighter in weight than the material of said main lamina.

2. A focal plane shutter according to claim 1 wherein the main lamina is made of steel and the auxiliary laminae are made of plastic.

3. A focal plane shutter according to claim 1 wherein the auxiliary laminae having a small range of movement are made of material lighter in weight than the material of the auxiliary laminae having a large range of movement.

4. A focal plane shutter according to claim 1 wherein the auxiliary laminae in which stresses do not concentrate when they are operated are made of material lighter in weight than the material of the auxiliary laminae in which stresses concentrate when they are operated.

5. A focal plane shutter according to claim 1 wherein one of the auxiliary laminae functions as the auxiliary arm and is made of the same material as that of the main lamina.

6. A focal plane shutter according to claim 1 wherein the main lamina is made of steel and the auxiliary laminae are made of aluminum.

7. A focal plane shutter according to claim 1 wherein the main lamina is made of steel and the auxiliary laminae are made of titanium.

8. A focal plane shutter according to claim 1 wherein the main lamina is made of steel and the auxiliary laminae are made of beryllium.

9. A focal shutter according to claim 1 wherein the main lamina is made of steel and the auxiliary laminae are made of a composite of plastic, aluminum, titanium and beryllium.

* * * * *